Aug. 25, 1953 C. L. DAMRON 2,650,297

RADIO RECEIVING SYSTEM

Filed Dec. 9, 1948

Inventor
CHARLES L. DAMRON
By James F. Jones
ATTORNEY

Patented Aug. 25, 1953

2,650,297

UNITED STATES PATENT OFFICE 2,650,297

RADIO RECEIVING SYSTEM

Charles L. Damron, Lexington, Ky.

Application December 9, 1948, Serial No. 64,313

12 Claims. (Cl. 250—20)

This invention relates to the suppression of heterogeneous electrical disturbances in radio reception, and more particularly to an apparatus for neutralizing the noise component of a received signal in the antenna circuit.

It is known in the prior art that a plurality of antennae may be combined in various ways with other electrical parameters and circuits to reduce or compensate for undesirable noise components of a received signal. For example, signals may be simultaneously received in a plurality of antennae and may be differentially combined to utilize the relative phases between them and thereby obtain some noise reduction. However, such systems do not take into consideration the fact that the strength and character of the received noise and signal components may vary in the different antennae.

Accordingly, the principal object of this invention is to provide an apparatus whereby signals received in a plurality of antennae may be differentially combined in such a manner that the noise component of the desired signal is effectively neutralized irrespective of the differences in the undesired signal characteristics.

Another object of the invention is to provide an apparatus for effectively neutralizing electrical disturbances in the antenna circuit independently of the receiver and in a simple and inexpensive manner.

A further object of the invention is to provide easily adjustable means in the antenna circuit for neutralizing noise components independently of the receiver system.

A still further object of the invention is to provide means for effectively neutralizing in the antenna circuit the noise components of a received signal independent of the receiver and in such a manner as to maintain desired signal energy.

In accordance with one embodiment of my invention two antenna circuits are inductively coupled by means of relatively movable inductances in the antenna circuits whereby said inductances are adjusted to differentially combine the noise or undesired component of the received signals of each antenna circuit, the resulting differential signal is then regeneratively amplified and the noise or undesired portion of the amplified signal is differentially combined with the first differential signal by means of an inductance in the output of said amplifier, which inductance is also movable relative to the inductances in the antenna circuits.

Figure 1:
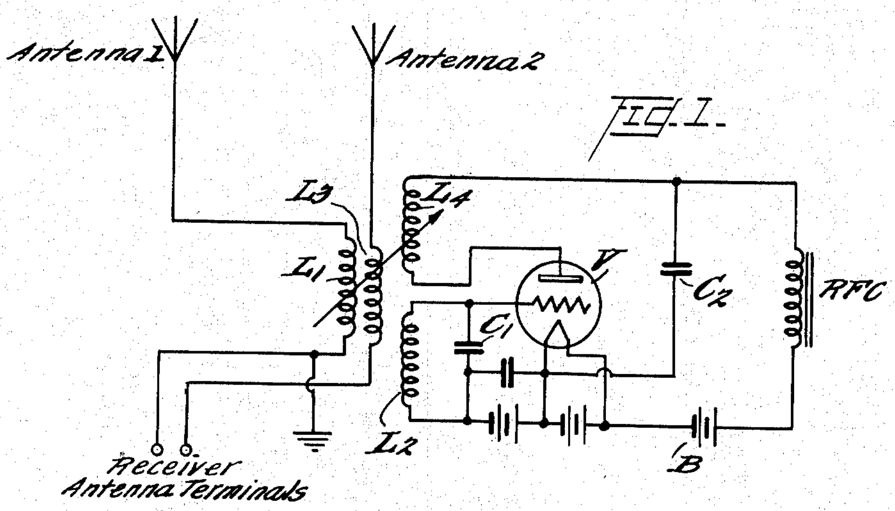
Figure 2:
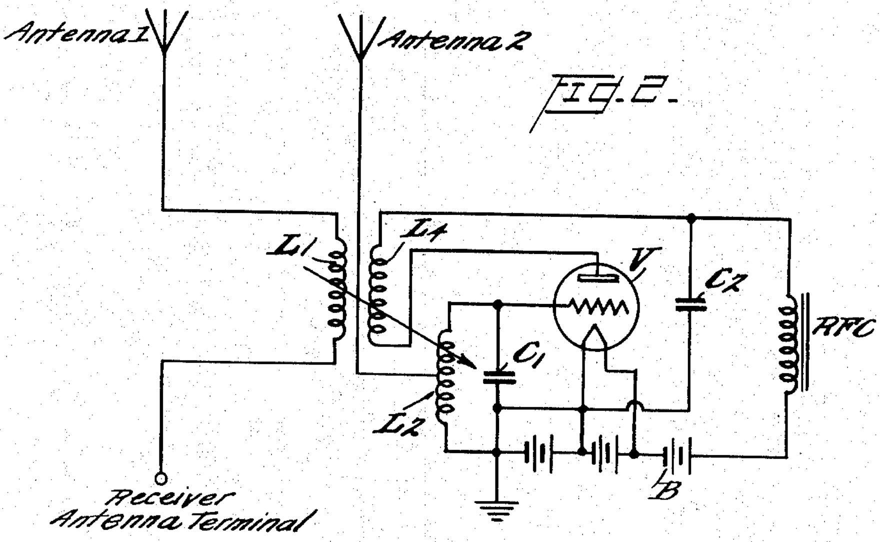

For a better understanding of my invention and only by way of illustration, together with other and further objects and advantages thereof, reference is made to the following description taken in connection with the accompanying drawings in which:

Figure 1 is a schematic diagram of a preferred embodiment of my invention for neutralizing noise in the antenna circuit; and Figure 2 is a schematic diagram of another embodiment of my invention showing the use of optional or alternative connections in the circuit of Figure 1.

Referring to Figure 1 of the drawings, two antennae are shown at 1 and 2 connected respectively through the inductances L1 and L3 to the receiver antenna terminals.

Inductances L1 and L3 may be any suitable inductance coils and may be arranged to be relatively movable in any well-known manner, for example as in a goniometer. The antenna circuit of antenna 1 is shown grounded at the receiver side of the inductance L1. Thus the circuit of antenna 2 forms a divider-type network with the receiver input circuit. Inductively coupled to this arrangement of the inductances L1 and L3 is a regenerative feedback amplifier of the type which is well-known in the art. The coupling is accomplished through a tuned circuit L2 and C1 which is tuned to resonance with the receiver. This tuned circuit is in the input of an electron discharge device V which, with its associated components, as indicated, forms a feedback circuit which is adapted to adjust the gain of the amplifier in a manner well-known in the art. This feedback circuit is formed in part by the plate circuit of the electron discharge device V which includes an inductance L4 arranged to be movable relative to the inductances L1 and L3 preferably by means of the same arrangement which is used to move the coils L1 and L3 relative to each other.

In operation the antennae are geographically separated by some distance and with the circuit L2C1 tuned to resonance with the receiver the coils L1, L3, and L4 are adjusted for optimum noise neutralization. It is obvious that with the antennae separated at a distance geographically or otherwise the desired signals will be received at a different phase relationship than the noise or undesired components. Thus, by rotating either coil L1 or L3, the noise transferred from antenna 1 to antenna 2 can be made opposite in phase to the noise picked up in antenna 2. However, due to the fact that the noise or undesired signal picked up by antenna 2 will normally differ in character and strength from that picked up by antenna 1, there will be a resultant differential noise component which may be amplified along with the desired signal in the regenerative amplifier. By adjusting the coil L4, which is also movable relative to the coils L1 and L3, the regeneration is caused to vary in value with the corresponding variation in gain of the amplifier. Thus, with a certain value of amplification the noise energy transferred from the circuit of antenna 1 to the circuit of antenna 2 is made equal and opposite in phase by differentially combining the output of the amplifier in the coil L4 with the first differential signal which resulted from the adjustment of the coils L1 and L3; since the amplification does not change the phase relationship but is used for the purpose of making equal the first differential noise component and the noise component of the amplified signal.

As previously mentioned, the separation of the antennae results in the reception of desired signals at different phase relationships than the undesired signals so that the desired signals are not neutralized completely by the same adjustments that are necessary to neutralize the undesired signals. Insofar as some neutralization of desired signal may occur, the amplification which aids in balancing out the undesired noise impulses compensates for any such partial neutralization of desired signal by also amplifying the desired signal. Thus it can be seen that the apparatus of the invention effectively neutralizes the noise component of a desired signal independent of the receiver and irrespective of the noise characteristics of the individual antennae in a plural antenna noise compensating system.

The circuit shown in Figure 2, in which like numbers and letters refer to like parts, functions in essentially the same manner and is basically the same as the circuit illustrated in Figure 1. The only difference between these two systems is the optional connection of antenna 2 to the tap on the coil of L2 which of course eliminates the need for coil L3 and necessitates connecting the amplifier input circuit to ground as shown and removing the ground connection from the coil L1. In this arrangement, only the coil L1 need be adjusted relative to the coil L2 to obtain the first differential signal which is subsequently amplified and again combined in accordance with the previous discussion relating to Figure 1.

It will be noted that the above discussion does not specify any particular angular relationship between the coils L1, L3, and L4. This is due to the fact that interfering frequencies vary and optimum neutralization may occur at correspondingly different positions of the coils relative to each other. Thus the apparatus of this invention provides a simple and flexible means of effectively neutralizing in the antenna circuit the noise component of a received signal independent of the receiver and in such manner as to maintain desired signal energy while neutralizing undesired components.

While I have shown and described what I consider to be the preferred embodiments of my invention, it will be obvious to those skilled in the art that various changes and modifications may be made without departing from my invention, and I therefore aim in the appended claims to cover all such changes and modifications as fall within the true spirit of my invention.

I claim:

1. A noise neutralization system comprising in combination a plurality of signal receiving antenna circuits, each of said circuits having an inductance, means coupling said inductances to differentially combine the noise portions of the received signals, a regenerative amplifier having its input inductively coupled to said inductances and having means inductively coupling its output to said inductances to differentially combine the noise portion of said amplified signal with said first differential signal thereby to effectively neutralize the noise portion of the desired signal.

2. A noise neutralization system comprising in combination a plurality of geographically spaced signal receiving antennae, each of said antennae connected to a circuit having an inductance, means coupling said inductances to differentially combine the noise portions of the received signals, a regenerative amplifier having its input inductively coupled to said inductances and having means inductively coupling its output to said inductances to differentially combine the noise portion of said amplified signal with said first differential signal thereby to effectively neutralize the noise portion of the desired signal.

3. A noise neutralization system comprising in combination a plurality of signal receiving antenna circuits, each of said circuits having a movable inductance, means coupling said movable inductances to differentially combine the noise portions of the received signals, a regenerative amplifier having its input inductively coupled to said inductances and having means inductively coupling its output to said inductances to differentially combine the noise portion of said amplified signal with said first differential signal thereby to effectively neutralize the noise portion of the desired signal.

4. A noise neutralization system comprising in combination a pluarlity of signal receiving antenna circuits, each of said circuits having an inductance, means coupling said inductances to differentially combine the noise portions of said received signals, a regenerative amplifier having an input and output, said input being inductively coupled to said inductances, and means inductively coupling said output to said inductances to differentially combine the noise portion of said amplified signal with said firt differential signal thereby to effectively neutralize the noise portion of the desired signal.

5. A noise neutralization system comprising in combination a plurality of signal receiving antenna circuits, each of said circuits having an inductance, means coupling said inductances to differentially combine the noise portions of said received signals, a regenerative feedback amplifier having its input inductively coupled to said inductances and having means inductively coupling its output to said inductances to differentially combine the noise portion of said amplified signal with said first differential signal thereby to effectively neutralize the noise portion of said desired signal.

6. A noise neutralization system comprising in combination a plurality of signal receiving antenna circuits, each of said circuits having an inductance, means coupling said inductances to differentially combine the noise portions of said received signals, a regenerative amplifier tuned to a desired signal, said amplifier having its input inductively coupled to said inductances and having means inductively coupling its output to said inductances to differentially combine the noise portion of said amplified signal with said first differential signal thereby to effectively neutralize the noise portion of said desired signal.

7. A noise neutralization system comprising in combination a plurality of geographically spaced signal receiving antennae, each of said antennae connected to a circuit having an inductance, means moving said inductances relative to each other to differentially combine the noise portions of said received signals, a regenerative feedback amplifier tuned to a desired signal and having an input and output, said input being inductively coupled to said inductances, and means inductively coupling said output to said inductances to differentially combine the noise portion of said amplified signal with said first differential signal thereby to effectively neutralize the noise portion of said desired signal.

8. A noise neutralization system comprising in combination a plurality of geographically spaced signal receiving antennae, each of said antennae connected to a circuit having an inductance, means moving said inductances relatively to each other to differentially combine the noise portions of said received signals, a regenerative feedback amplifier tuned to a desired signal, said amplifier having an input inductively coupled to said inductances and an output, an inductance in said output coupled to said antenna inductances and movable relative thereto to differentially combine the noise portion of said amplified signal with said first differential signal thereby to effectively neutralize the noise portion of said desired signal.

9. A noise neutralization system comprising in combination a plurality of signal receiving antenna circuits, each of said circuits having an inductance, means coupling said inductances to differentially combine the noise portions of said received signals, a regenerative amplifier having an input and an output, said input tuned to a desired signal, said output including a feedback circuit adapted to adjust the gain of said amplifier, said input and said output having inductances coupled to said antenna inductances, means varying the coupling of said output inductance to differentially combine the noise portion of said amplified signal with said first differential signal thereby to effectively neutralize the noise portion of said desired signal.

10. A noise neutralization system comprising in combination a plurality of signal receiving antenna circuits, each of said circuits having an inductance, means coupling said inductances to differentially combine the noise portions of said received signals, a regenerative amplifier having an electron discharge device, said electron discharge device having an input and an output, said input tuned to a desired signal, said output including a feedback circuit adapted to adjust the gain of said amplifier, said input and said output having inductances coupled to said antenna inductances, means varying the coupling of said output inductance to differentially combine the noise portion of said amplified signal with said first differential signal to thereby effectively neutralize the noise portion of said desired signal.

11. In a noise neutralization system, the combination comprising a plurality of geographically spaced signal receiving antennae, each of said antennae having a circuit including an inductance connected to a receiver, means moving said inductances relative to each other to differentially combine the noise portions of said received signals, a regenerative amplifier having an input and an output tuned to a desired signal, said output including a feedback circuit adapted to adjust the gain of said amplifier, said input and output each having inductances coupled to said antenna inductances, said output inductance being movable relative to said antenna inductances to differentially combine the noise portion of said amplified signal with said first differential signal thereby to effectively neutralize the noise portion of said desired signal.

12. In a noise neutralization system, the combination comprising a plurality of geographically spaced signal receiving antennae, each of said antennae having a circuit including an inductance connected to a receiver, movable means coupling said inductances to differentially combine the noise portions of said received signals, a regenerative amplifier having an electron discharge device, said electron discharge device having an input and an output, said input tuned to a desired signal, said output including a feedback circuit adapted to adjust the gain of said amplifier, said input and said output each having inductances coupled to said antenna inductances, said output inductance being movable relative to said antenna inductances to differentially combine the noise portion of said amplified signals with said first differential signal thereby to effectively neutralize the noise portion of said desired signal.

CHARLES L. DAMRON.

References Cited in the file of this patent

UNITED STATES PATENTS

| Number | Name | Date |
|---|---|---|
| 1,590,198 | McCaa | June 29, 1926 |
| 1,702,445 | Landon | Feb. 19, 1929 |
| 1,723,907 | Alexanderson | Aug. 6, 1929 |
| 2,034,548 | Zidar | Mar. 17, 1936 |
| 2,139,533 | Whisk | Dec. 6, 1938 |

FOREIGN PATENTS

| Number | Country | Date |
|---|---|---|
| 638,941 | France | June 7, 1928 |
| 186,104 | Switzerland | Nov. 16, 1936 |
| 802,392 | France | June 6, 1936 |